United States Patent [19]
Lee et al.

[11] Patent Number: 6,082,629
[45] Date of Patent: Jul. 4, 2000

[54] PHOTORESIST SUCK-BACK DEVICE IN MANUFACTURING SYSTEM FOR SEMICONDUCTOR DEVICES

[75] Inventors: Gyu-myeung Lee, Yongin; Jong-soo Kim; Ill-jin Jang, both of Suwon, all of Rep. of Korea

[73] Assignee: Samsung Electronics, Co., Ltd., Suwon, Rep. of Korea

[21] Appl. No.: 09/160,452

[22] Filed: Sep. 24, 1998

[30] Foreign Application Priority Data

Sep. 26, 1997 [KR] Rep. of Korea .................. 97-49245

[51] Int. Cl.$^7$ ............................................. B05B 15/02
[52] U.S. Cl. ....................... 239/106; 239/119; 251/57; 251/61.1; 137/467.5
[58] Field of Search .................. 239/106, 119; 251/57, 61.1; 137/467.5

[56] References Cited

U.S. PATENT DOCUMENTS 5,857,661  1/1999  Amada et al. ........................ 251/57

*Primary Examiner*—Henry J. Recla
*Assistant Examiner*—Timothy L. Maust
*Attorney, Agent, or Firm*—Marger Johnson & McCollom, P.C.

[57] ABSTRACT

A photoresist suck-back device is shown for a photoresist supply apparatus in a semiconductor device manufacturing system which prevents the accumulation of photoresist inside a photoresist spray line. The suck-back device is composed of a suck-back valve which is installed on a photoresist spray line connected to a photoresist supply line of a photoresist supply apparatus. The suck-back valve is constructed of a suction chamber for sucking the photoresist remaining within the photoresist spray line. The suction chamber is shrinkable and has a shape such that the sucked photoresist is not accumulated therein. A control part controls the size of the suction chamber of the suck-back valve through an air line. A cut-off valve is disposed between the photoresist supply line and the photoresist spray line which opens and closes the photoresist supply line under control of the control part through the air line.

24 Claims, 3 Drawing Sheets

PHOTORESIST SUCK-BACK DEVICE IN MANUFACTURING SYSTEM FOR SEMICONDUCTOR DEVICES

FIELD OF THE INVENTION

The present invention relates to manufacturing equipment for semiconductor devices and, more particularly, to a photoresist suck-back device having a diaphragm for preventing the accumulation of photoresist inside a photoresist pipe-line of a manufacturing system for semiconductor devices.

DESCRIPTION OF THE RELATED ART

Generally, photolithography in the semiconductor device fabrication process is a technology to form a specific pattern on a wafer by selectively removing the uppermost layer thereof. First, a pattern for circuit distribution is designed and a mask is manufactured based on the pattern. Then, an exposure process is carried out by irradiating light on the wafer having photoresist deposited thereon by using the above mask. The photoresist exposed in the above Exposure process according to the specific pattern is then removed by a development process. Subsequently, an etching process is carried out in order to remove the exposed portion of the layer on the wafer surface, which is formed according to the above photoresist pattern. Then, the photoresist portion finally remaining on the wafer surface is removed by carrying out a stripping process.

In the process described above, the photoresist is deposited on a wafer surface by a coating process. The coating process is composed of several steps. The first step is wafer surface treatment which involves cleaning with a brush or high-pressure deionized water in order to remove dust or moisture from the wafer surface which will have the photoresist deposited thereon. Next, catalyst deposition is performed which involves depositing catalyst on the wafer surface in order to increase the adhesiveness between the wafer surface and the photoresist to be deposited. Photoresist is then deposited by coating the wafer surface with photoresist with a desired thickness. The wafer is then soft-baked to volatize the solvent remaining on the photoresist and harden the photoresist thereon in order to harden it appropriately.

A spin method is normally used in order to coat a wafer with photoresist. In the spin method, photoresist is sprayed onto the surface of a wafer fixed on a vacuum chuck and the wafer is rotated at a low or high rotation rate so as to obtain a precise control of the photoresist thickness.

The equipment used to perform the spin method is of two kinds, a half-automatic spinner, and an automatic spinner in which the wafer is loaded/unloaded automatically.

The above spinners commonly have a photoresist suck-back device which prevents the photoresist from drying at the end of a spray nozzle when the spray of photoresist stops by forming suck-back pressure in the passageway feeding photoresist to the spray nozzle.

FIG. 1 shows a conventional photoresist suck-back device generally provided in a spinner. The photoresist suck-back device is composed of a suck-back valve 10 which is installed on the middle of a photoresist spray line 5 connected to a photoresist supply line 4, in which a certain amount of photoresist 2 inside the photoresist spray line 5 is sucked back by a suck-back pressure applied on the photoresist therein. The suck-back device also includes a control part (not shown) which controls the air pressure variation in the device through an air line 24 for the operation of the suck-back valve 10. A cut-off valve 20 is installed between the photoresist supply line 4 and the suck-back valve 10 which is connected to the control part and the suck-back valve 10 through the air line 24. The cut-off valve 20 opens and closes the photoresist supply line 4 according to the control part so that the suck-back valve 10 starts to operate with the photoresist supply line 4 closed.

Turning now to FIG. 2, the suck-back valve 10 is composed of a suck-back valve body 11 that is sealed from the outside atmosphere and a diaphragm 15 provided in a suction chamber 18 positioned between the suck-back valve body 11 and the photoresist nozzle 4. The diaphragm 15 forms pressure for sucking back the photoresist 2 filling the photoresist spray line 5 according to the air pressure inside the suck-back valve 10.

A pusher 13, in FIG. 1, is positioned inside the suck-back valve body 11 and controls the operational range of the diaphragm 15 in order to control the suck-back height of the photoresist 2. A suck-back height control screw 12 controls the height of the pusher 13. And a return spring 14 maintains the position of the pusher 13.

The suction chamber 18 is connected to the photoresist spray line 5 and has a suction opening 16 for sucking the photoresist 2.

The cut-off valve 20 is installed inside a cut-off valve body 21 sealed from the outside atmosphere. The cut-off valve 20 is composed of a cut-off rod 23 and a return spring 22. The photoresist supply line 4 is opened up when the air pressure inside the cut-off valve 20 is increased by the induced air through the air line 24. Conversely, when the air pressure inside the cut-off valve 20 is reduced by exhausing air through the air line 24, the photoresist supply line 4 is closed by the cut-off rod 23. The return spring 22 functions to maintain the position of the cut-off rod 23 when the cut-off valve 20 closes the photoresist supply line 4.

That is, when air is induced into the cut-off valve 20 through the air line 24 according to the control part, then the air pressure inside the cut-off valve 20 is increased. Therefore, when the force from the increased inner pressure overcomes the bias force of the return spring 22, then the cut-off rod 23 which had been blocking the photoresist supply line 4 is raised so that the photoresist 2 flows through the photoresist spray line 5 and out the tip 3.

At the same time, air is also induced into the suck-back valve 10 connected to the air line 24 so as to increase the pressure of the inner air, and expand the diaphragm 15 by the force from the air pressure, wherein the expanded diaphragm 15 is maintained by the air pressure.

When the spraying of photoresist 2 onto wafer W is completed, then the air pressure inside the air line 24, which was elevated during the spray of photoresist 2, is reduced. As a result, the pressure in the cut-off valve 20 connected to the air line 24 decreases and the force of the return spring 14 overcomes the force of the air pressure inside cut-off valve 20. This causes the cut-off rod 23 to come down and block the photoresist supply line 4 so that the photoresist spray line 5 is closed and the spray of photoresist for the photoresist deposition stops while the shuck 1, shown in FIG. 2, with the wafer W fixed thereon is rotated in order to deposit the photoresist to a controlled thickness.

When the air inside the suck-back valve 10, which is connected to the air line 24, is exhausted and the air pressure therein is decreased, then the diaphragm 15 shrinks. The shrinking space of the diaphragm 15 causes suck-back pressure to be applied to the photoresist 2 inside the photoresist spray line 5. Therefore, the photoresist 2 remaining within the spray line 5 is drawn back into the tip 3 to thereby minimize its exposure to the outside.

In addition, a protrusion 17 is provided inside the suck-back valve body 11 which supports the pusher 13. The height of the pusher 13 is easily externally controlled by the suck-back height control screw 12. In turn, the suck-back height of the photoresist 2 sucked back from the tip 3 is controlled by the return spring 14 which maintains the height of the pusher 13.

Therefore, the photoresist 2 on the tip 3 is prevented from hardening and the spray operation of the photoresist can be consistently carried out.

However, in the conventional suck-back device in the semiconductor device fabrication process as shown in FIG. 2, the photoresist 2 accumulated in the suction chamber 18 is isolated from the flow inside the photoresist spray line 5 and is accumulated inside the suction chamber 18 in a no-movement state. As a result, the photoresist 2 accumulated in the suction chamber 18 forms a vortex stream and is not exhausted through the photoresist spray line 5.

The photoresist trapped inside the suction chamber 18 subsequently deteriorates forming bubbles and hard particles. As a result, when the accumulated photoresist is subsequently discharged, it causes wafer production flaws.

SUMMARY OF THE INVENTION

The present invention is directed to provide a photoresist suck-back device of photoresist supply apparatus in manufacturing system of semiconductor devices, which substantially overcomes one or more of the problems due to the limitations and disadvantages of the related art.

One object of the present invention is to provide a photoresist suck-back device having a diaphragm in manufacturing system of semiconductor devices, wherein the accumulation of the photoresist inside a photoresist spray line is prevented by providing a suck-back valve with a dome-shaped diaphragm in the photoresist spray line so that wafers in a good-quality are produced.

To achieve this and other advantages and in accordance with the purpose of the present invention, as embodied and broadly described, a photoresist suck-back device in manufacturing systems of semiconductor devices comprises: a suck-back valve which is installed on the middle of a photoresist spray line connected to a photoresist supply line of a photoresist supply apparatus, and comprises a suction chamber for sucking the photoresist remaining inside the photoresist spray line the suction chamber being shrinkable and having a shape such that the sucked photoresist is not accumulated therein; a control part for controlling the size of the suction chamber of the suck-back valve through an air line of the photoresist supply apparatus; and a cut-off valve which is installed between the photoresist supply line and the photoresist spray line, and opens/closes the photoresist supply line through the air line.

It is to be understood that both the foregoing general description and the following detailed description are exemplary and explanatory and are intended to provide further explanation of the invention as claimed.

DETAILED DESCRIPTION OF THE PRESENT INVENTION

Reference will now be made in detail to the preferred embodiments of the present invention, examples of which are illustrated in the accompanying drawings.

Figure 1:
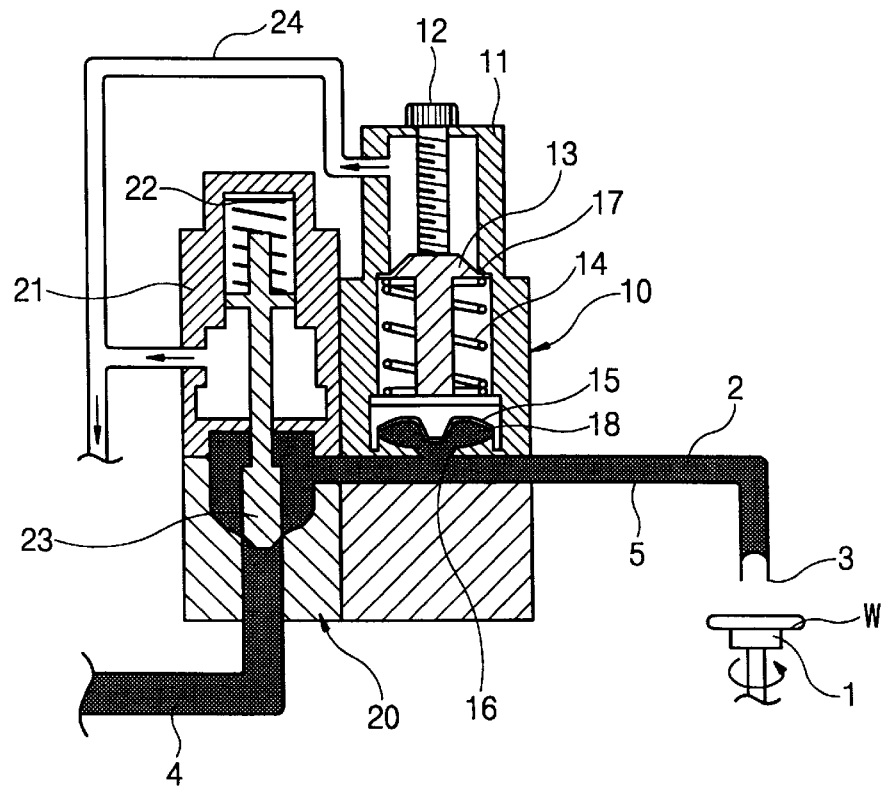
FIG. 1 is a schematic representation showing the conventional suck-back device of the photoresist supply apparatus.
Figure 2:
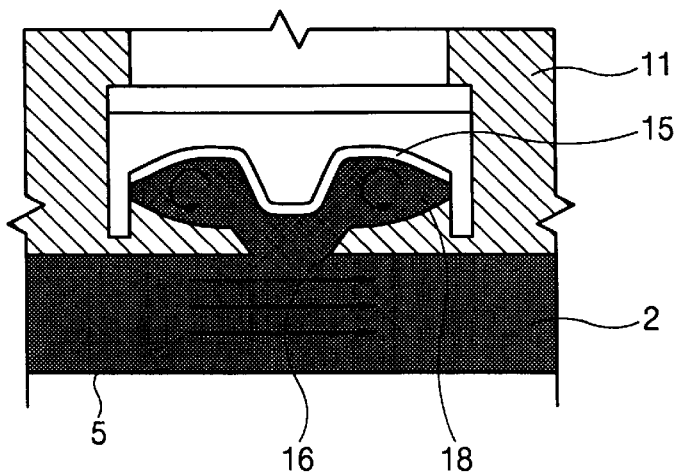
FIG. 2 is a cross-sectional view showing the flow of photoresist in the contact of the suck-back device and the photoresist nozzle in FIG. 1.
Figure 3:
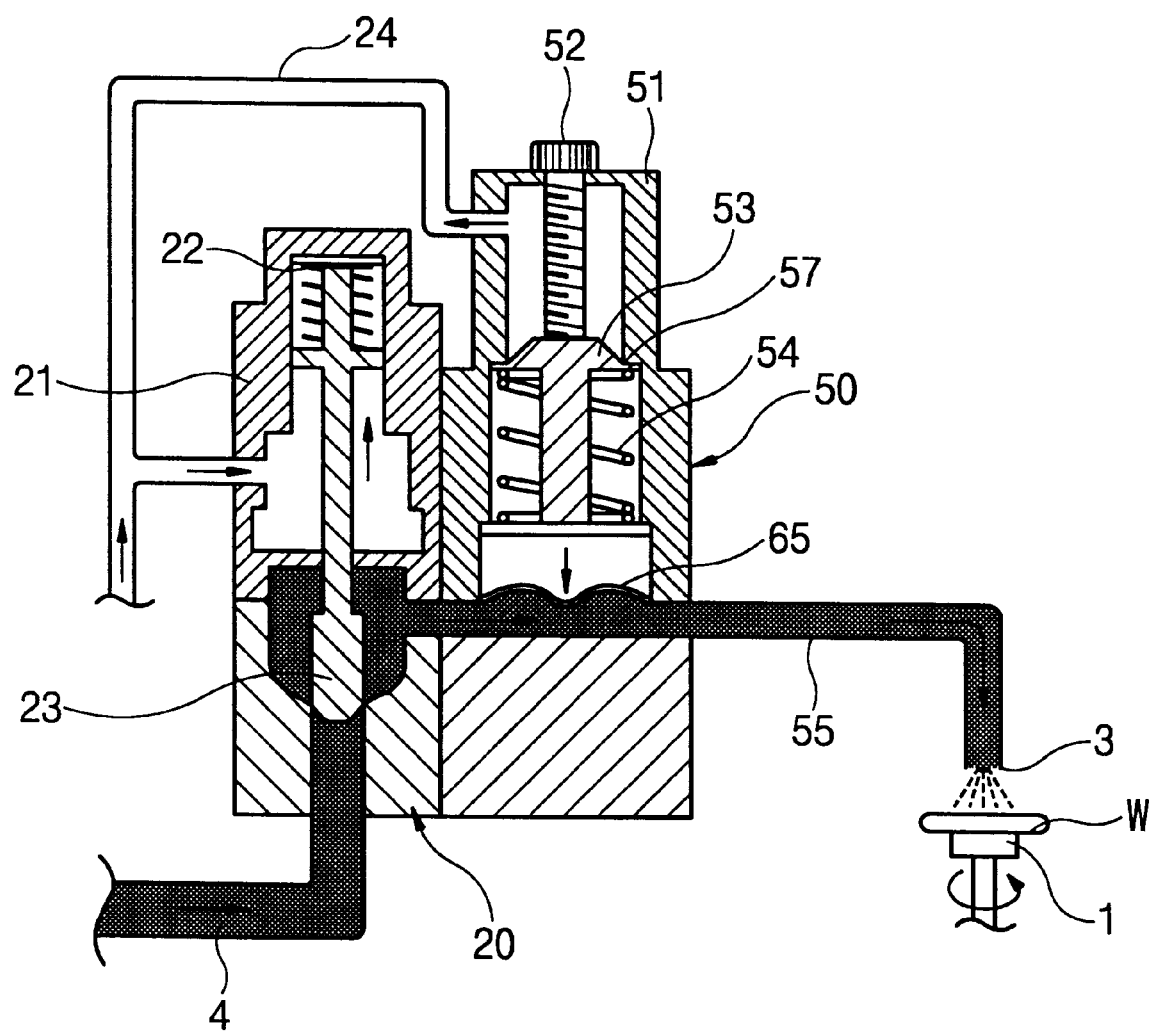
FIGS. 3 and 4 are a schematic representation showing the suck-back device of the photoresist supply apparatus according to the present invention.
Figure 4:
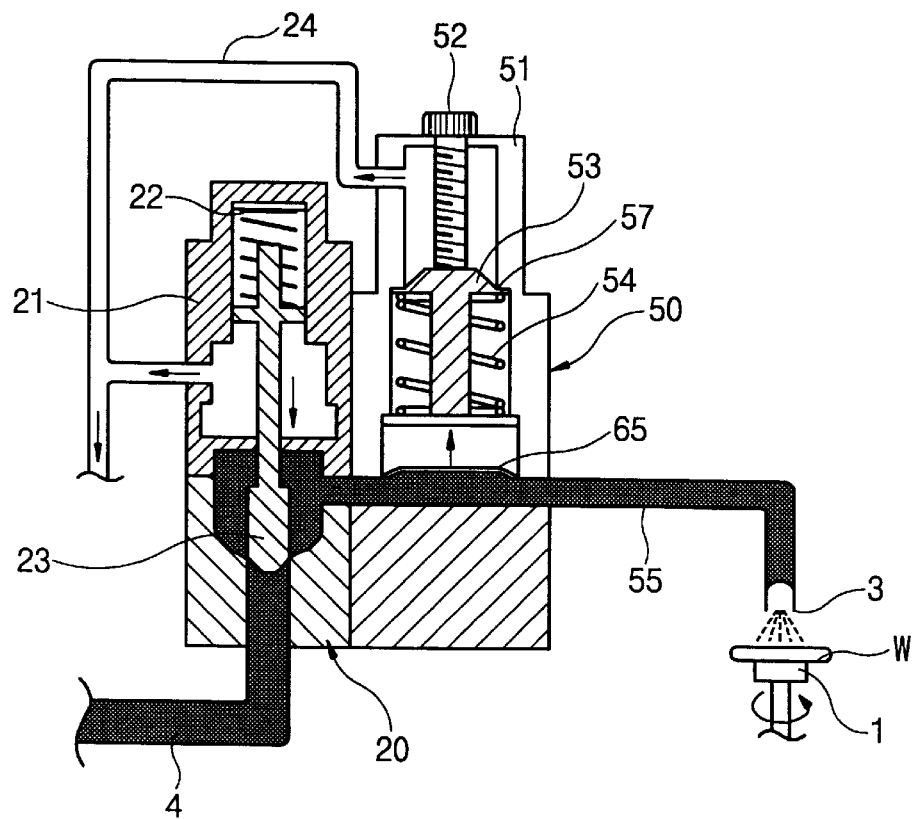

FIGS. 3 and 4 are a schematic representation showing a suck-back device of a photoresist supply apparatus according to the present invention.

Figure 5:
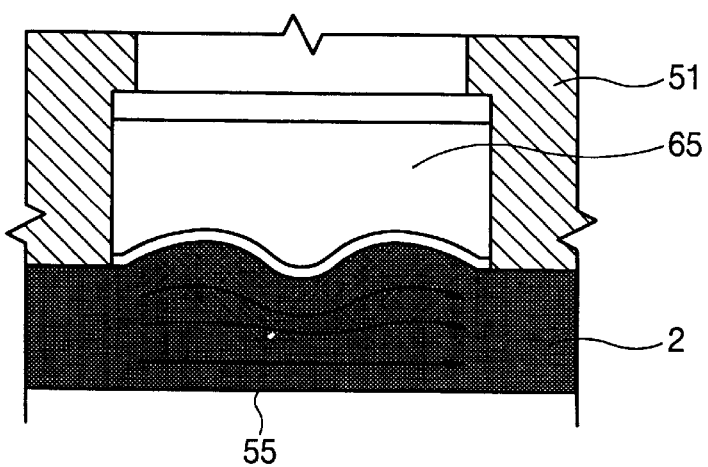
FIG. 5 is a cross-sectional view showing the flow of photoresist in the contact of the suck-back device and the photoresist nozzle in FIG. 3.

Referring to FIGS. 3 and 4, the photoresist suck-back device, according to the present invention, in a manufacturing system for semiconductor devices is composed of a suck-back valve 50 which is installed adjacent a middle section of a photoresist spray line 55 connected to a photoresist supply line 4 of a photoresist supply apparatus. The suck-back valve 50 has a shrinkable suction chamber with a curved shape for sucking a certain amount of photoresist 2 remaining inside the photoresist spray line 55, as shown in FIG. 5, by forming suck-back pressure thereon so that the accumulation of photoresist 2 is prevented.

A control part (not shown) controls the operation of the suction chamber of the suck-back valve 50 through variation in the air pressure in the suck-back valve through air line 24 of the photoresist supply apparatus. A cut-off valve 20 is installed between the photoresist supply line 4 and the suck-back valve 50 and is connected to the control part and the suck-back valve 50 through the air line 24. The cut-off valve 20 opens and closes the photoresist supply line 4 according to the control part so that the suck-back valve 50 begins to operate when the photoresist supply line 4 is closed.

Preferably, the suck-back valve 50 and the cut-off valve 20 are controlled at the same time by the control part through an air line 24.

The suck-back valve 50 is constructed of a suck-back valve body 51 sealed from the outside atmosphere, a suction chamber and a diaphragm 65 having a thin film streamlined shape without a protrusion. The diaphragm 65 separates the suction chamber from the photoresist spray line 55 such that a laminar flow of photoresist is formed when suck-back pressure is applied to the photoresist 2 inside the photoresist spray line 55, as illustrated in FIG. 5.

A pusher 53 is installed inside the suck-back valve body 51 and controls the suck-back height of photoresist 2 by adjusting the operational range of the diaphragm 65. A suck-back height control screw 52 controls the height of the pusher 53 from outside of the suck-back valve body 51. A return spring 54 maintains the position of the pusher 53.

Preferably, the diaphragm 65 has a round concave dome shape or curved sea gull shape at its cross-section.

The cut-off valve 20 is constructed of a cut-off valve body 21 sealed from the outside atmosphere and a cut-off rod 23 which is installed inside the cut-off valve body 21 and opens the photoresist supply line 4 when the air pressure is increased within the cut-off valve body 21 through introduction of air through air line 24. Likewise, the cut-off rod 23 closes the photoresist supply line 4 when the air pressure is decreased within the cut-off valve body 21 through exhaustion of air through air line 24. A return spring 22 is biased to maintain the position of the cut-off rod 23 within the photoresist supply line 4 when the cut-off rod 23 closes.

Referring now to FIG. 3, when air is induced into the cut-off valve 20 through the air line 24 according to the control part, then the air pressure inside the cut-off valve 20 is increased. Therefore, when the force from the increased inner air pressure overcomes the bias force of the return spring 22, then the cut-off rod 23 which blocked the photoresist supply line 4 will be raised so that the photoresist 2 flows through the photoresist spray line 55 and is sprayed out the tip 3.

At the same time, air is also induced into the suck-back valve 50 connected to the air line 24 so as to increase the air pressure within the suck-back valve body 51 and expand the diaphragm 65. At this point, the position of the expanded diaphragm 65 is maintained by the air pressure within the suck-back valve body 51.

When the deposition of photoresist on wafer W is completed, the air pressure inside the air line 24, which was increased during the process step of spraying the photoresist 2, is decreased in order to halt the flow of the photoresist 2. The chuck 1 having the wafer W fixed thereon is then rotated to evenly distribute the photoresist deposited on the wafer W.

As shown in FIG. 4, when the air pressure inside the cut-off valve 20 connected to the air line 24 is decreased, then the bias force of the return spring 22 overcomes the force of the air pressure within the cut-off valve 20. Thus, the return spring will force the cut-off rod 23 down and close off the photoresist spray line 4.

At the same time, the air inside the suck-back valve body 51, which is also connected to the air line 24, is exhausted and the air pressure therein is decreased. Thus, diaphragm 65 will shrink and suck-back pressure is applied to the photoresist 2 inside the photoresist spray line 5 by the reduced space of the suction chamber caused by the shrinking of diaphragm 65. Photoresist 2 is therefore drawn back into the tip 3 to minimize the exposure of photoresist to the outside atmosphere.

A protrusion 57 is provided inside the suck-back valve body 50, and the pusher 53 is supported by the protrusion 57. The height of the pusher 53 is easily controlled from outside of the suck-back valve body 51 by the suck-back height control screw 52. The suck-back height of the photoresist 2 sucked back from the tip 3 is controlled by the return spring 54 which maintains the height of the pusher 53.

Therefore, using the present invention, the photoresist 2 can be consistently sprayed without the hardening of the photoresist 2 occurring in the tip 3.

As shown in FIG. 5, the photoresist suck-back device, according to the present invention, for a semiconductor device manufacturing system has a streamlined shaped-diaphragm 65 in direct contact with the photoresist spray line 4 which has no protrusion or suction chamber on its contacted surface so that the photoresist 2 forms a laminar flow within the photoresist spray line 55.

Therefore, good photoresist quality is maintained by eliminating a suction chamber in the supply apparatus.

While the present invention has been described in detail with respect to a specific embodiment, it will be understood to those of ordinary skill in the art that various changes, substitutions and alterations can be made thereto without departing from the spirit and scope of the invention. We claim all art falling within the scope of the attached claims.

What is claimed is:

1. A photoresist suck-back device for a semiconductor device manufacturing system, the suck-back device comprising:

a suck-back valve configured to be disposed on a photoresist spray line coupled to a photoresist supply line of a photoresist supply apparatus, the photoresist spray line having a sidewall, wherein the suck-back valve includes a suction chamber for sucking a portion of the photoresist remaining inside said photoresist spray line, said suction chamber being shrinkable and having a shape such that the sucked photoresist is not accumulated therein, and further wherein the suck-back valve is configured to be coupled through an air line to a control part for controlling the size of said suction chamber, the suck-back valve further includes a diaphragm having a fluid-confronting surface that forms a generally planar region of the sidewall of the photoresist spray line that is flush therewith; and a cut-off valve which is installed between said photoresist supply line and said photoresist spray line, and opens/closes said photoresist supply line through said airline.

2. The photoresist suck-back device for a semiconductor device manufacturing system as claimed in claim 1, wherein said suck-back valve and said cut-off valve are simultaneously controlled by said control part through said air line.

3. The photoresist suck-back device for a semiconductor device manufacturing system as claimed in claim 1, wherein said suck-back valve further comprises:

a suck-back valve body which is configured to be sealed from an outside atmosphere, wherein the suction chamber is formed within the suck-back valve body;

wherein said diaphragm configured to be disposed between the suction chamber formed in the suck-back valve body and said photoresist spray line so as to form a boundary between the suction chamber and the photoresist spray line, the diaphragm having a concave dome-shape, wherein an apex of the dome is oriented away from the suction chamber, and further wherein the diaphragm is configured to contact the photoresist within the photoresist spray line and is elastic such that the suction chamber is shrinkable toward the suck-back valve.

4. The photoresist suck-back device for a semiconductor device manufacturing system as claimed in claim 3, wherein said diaphragm has a curved-sea gull cross-sectional shape.

5. The photoresist suck-back device for a semiconductor device manufacturing system as claimed in claim 3, wherein said suck-back valve further includes:

a pusher disposed within said suck-back valve body and configured to control a suck-back height of the photoresist by adjusting the shrinkage of said diaphragm;

a suck-back height control screw for controlling a height of said pusher from outside of said suck-back valve body; and a bias member for maintaining a position of said pusher.

6. The photoresist suck-back device for a semiconductor device manufacturing system as claimed in claim 5, wherein said bias member is a coil-type return spring.

7. A photoresist suck-back device for a semiconductor device manufacturing system, the suck-back device comprising:

a suck-back valve body having formed therein a bore, the bore being in communication with first and second apertures, the first aperture being configured to receive an air line such that an air pressure level of the bore can be controlled by a flow of air in the air line, and the second aperture being configured to communicate with a photoresist spray line having a sidewall; and a diaphragm disposed in the second aperture of the suck-back valve body and configured to separate the bore of the suck-back valve body from the photoresist spray line, said diaphragm having a fluid-confronting surface that forms a generally planar region of the sidewall of the photoresist spray line that is flush therewith.

8. The suck-back device of claim 7, wherein the diaphragm is constructed of an elastic material.

9. The suck-back device of claim 8, wherein the diaphragm has a streamlined shape without a protrusion configured to form a laminar flow in a photoresist fluid passing through the photoresist spray line.

10. The suck-back device of claim 9, wherein the diaphragm has a concave dome-shape, wherein an apex of the dome is oriented away from the bore.

11. The suck-back device of claim 9, wherein the diaphragm has a curved sea gull cross-sectional shape.

12. The suck-back device of claim 9, wherein the suck-back device further comprises:

a pusher disposed within the bore of the suck-back valve body along a lengthwise axis of the bore and capable of reciprocating motion along the lengthwise axis of the bore;

an adjustable height control member disposed within the bore of the suck-back valve body along the lengthwise axis of the bore and configured to contact the pusher so as to define a first limit of a range of the reciprocating motion of the pusher; and a bias member disposed within the bore of the suck-back valve body along the lengthwise axis of the bore and configured to bias the pusher to a predetermined position.

13. The suck-back device of claim 12, where the suck-back valve body further includes a threaded screw hole disposed along the lengthwise axis of the bore and in communication with the bore and wherein the adjustable height control member is a threaded screw disposed within the threaded screw hole.

14. The device of claim 11 wherein said surface of said diaphragm is smoothly contiguous along an axial extent within the planar region of the sidewall.

15. The device of claim 12 wherein no region of said fluid-confronting surface of said diaphragm confronts the photoresist fluid's path through the spray line at an acute angle.

16. The device of claim 11 which further comprises:

a push rod movable axially within said chamber, said push rod being urged toward said proximal region of said chamber by said pneumatic drive mechanism when said drive mechanism is activated, thereby enlarging the volume of said chamber; and a bias mechanism coupled with said push rod for urging said push rod away from said proximal region of said chamber when said drive mechanism is deactivated, thereby reducing the volume of said chamber.

17. The device of claim 16, wherein said bias mechanism is a return spring.

18. A photoresist suck-back device for preventing the accumulation of photoresist inside a photoresist spray line, the device comprising:

a pneumatic drive;

a photoresist supply line;

a photoresist spray line in selective fluid communication with said photoresist supply line, said photoresist spray line having a photoresist-confronting inner sidewall;

a suck-back valve for sucking back a portion of photoresist within said photoresist spray line, said suck-back valve being coupled with said photoresist spray line, said suck-back valve comprising:

a diaphragm having a photoresist-confronting inner surface;

a chamber substantially sealed by said diaphragm, said diaphragm defining a wall of said chamber and being movable therein to vary the volume of said chamber; and a piston coupled with said diaphragm, said piston further being coupled with said pneumatic drive to vary the volume of said chamber by movement of said diaphragm therein, said suck-back valve being mounted adjacent said photoresist spray line with said diaphragm forming a substantially contiguous sidewall of said photoresist spray line in a flush relationship therewith, said device further comprising:

a valve coupled with said pneumatic drive, said valve being positioned between said photoresist supply line and said photoresist spray line, said valve when open permitting photoresist to flow from said photoresist supply line into said photoresist spray line and said valve when closed preventing such flow of photoresist from said photoresist supply line to said photoresist spray line, said closing of said supply line activating said piston to reduce said volume of said chamber thereby to form a concavity in the region of said diaphragm for holding the portion of photoresist.

19. A suck-back device for use in a photoresist fluid spray mechanism that includes a spray line with a sidewall and a spray tip, the spray line providing for a nominal volumetric containment for photoresist fluid under the influence of a pneumatic drive mechanism when said drive mechanism is activated, the spray line otherwise having photoresist fluid in pressure equilibrium with the exterior of the spray line, the device comprising:

a chamber of variable volume extending radially away from the spray line, a proximal extent of said chamber being defined by a resilient diaphragm that substantially seals said chamber, said diaphragm having a fluid-confronting surface that forms a generally planar region of the sidewall of the spray line that is flush therewith, said diaphragm responsive to the variable volume of said chamber flexing distally and proximally, thereby increasing and decreasing the nominal volume of the spray line;

said chamber being coupled with said pneumatic drive mechanism such that, when the drive mechanism is deactivated, the volume of said chamber is reduced and said diaphragm responsive thereto flexes distally thereby sucking back the photoresist fluid partway inwardly from the tip of the spray line.

20. A method of sucking back photoresist in a photoresist spray line having a sidewall, the method comprising:

providing a suction chamber in communication with the photoresist spray line;

separating the suction chamber from the photoresist spray line with a diaphragm, said diaphragm having a fluid-confronting surface that forms a generally planar region of the sidewall of the spray line that is flush therewith;

increasing pressure in the suction chamber when photoresist is allowed to flow in the photoresist spray line; and decreasing the pressure in the suction chamber when the flow of photoresist in the photoresist spray line is halted.

21. The method of claim 20, wherein the diaphragm is elastic.

22. The method of claim 21, further including the step of shaping the diaphragm such that the diaphragm creates a laminar flow in the photoresist in the photoresist spray line when photoresist is allowed to flow.

23. The method of claim 22, wherein the step of shaping the diaphragm such that the diaphragm creates a laminar flow in the photoresist in the photoresist spray line when photoresist is allowed to flow further comprises providing a concave dome-shape to the diaphragm, wherein an apex of the dome is oriented away from the suction chamber.

24. The method of claim 21, wherein:

the step of increasing pressure in the suction chamber when photoresist is allowed to flow in the photoresist spray line includes deacuating a cut-off valve coupled to a photoresist supply line simultaneously to increasing the pressure in the suction chamber; and the step of decreasing the pressure in the suction chamber when the flow of photoresist in the photoresist spray line is halted includes actuating the cut-off valve simultaneously to decreasing the pressure in the suction chamber.

\* \* \* \* \*